United States Patent
Knap et al.

(10) Patent No.: US 12,348,110 B2
(45) Date of Patent: Jul. 1, 2025

(54) SYSTEMS AND METHODS FOR MOTOR CONTROL CENTER BUS BARS

(71) Applicant: Rockwell Automation Technologies, Inc., Mayfield Heights, OH (US)

(72) Inventors: Milosz Knap, Katowice (PL); Daniel Jastrzebski, Mikolow (PL); Corey A. Peterson, Grafton, WI (US); Pawel Kokula, Dabrowa Gomicza (PL); Troy M. Bellows, Racine, WI (US); Scott D. Day, Richfield, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 911 days.

(21) Appl. No.: 17/482,697

(22) Filed: Sep. 23, 2021

(65) Prior Publication Data

US 2023/0092966 A1     Mar. 23, 2023

(51) Int. Cl.
*H02K 5/06*     (2006.01)
*H02G 5/06*     (2006.01)
(Continued)

(52) U.S. Cl.
CPC .............. *H02K 5/225* (2013.01); *H02G 5/06* (2013.01); *H02K 5/04* (2013.01); *H02K 11/33* (2016.01); *H02K 15/00* (2013.01)

(58) Field of Classification Search
CPC ........ H02K 5/225; H02K 11/33; H02K 11/30; H02K 5/04; H02K 15/00; H02G 5/06; H02B 1/36; H02B 1/21
(Continued)

(56) References Cited

U.S. PATENT DOCUMENTS 4,366,528 A * 12/1982 Cole .................. H02G 5/025
  361/650
2006/0067018 A1* 3/2006 Malkowski, Jr. .... H01R 25/142
  361/2
(Continued)

FOREIGN PATENT DOCUMENTS

GB           1540753 A      2/1979
KR       101336969 B1     12/2013
(Continued)

OTHER PUBLICATIONS

Extended European Search Report for Application No. 22195390.4 mailed Apr. 24, 2023, 10 pages.

*Primary Examiner* — Alexander A Singh
(74) *Attorney, Agent, or Firm* — Fletcher Yoder, P.C.

(57) ABSTRACT

A motor control center (MCC) for an industrial automation system, includes an enclosure housing comprising a plurality of sections, including a first section having one or more buckets, including a first bucket, a first bus bar, a second bus bar, and a third bus bar extending horizontally across the first section along a back plane of the enclosure housing, and a first electrical component, configured to perform one or more functions of the MCC, disposed within the first bucket of the first section. The first electrical component is directly electrically coupled to the first set of bus bars such that the first electrical component draws a first phase of power from the first bus bar, a second phase of power from the second bus bar, and a third phase of power from the third bus bar.

20 Claims, 8 Drawing Sheets

(51) Int. Cl.
 *H02K 5/04* (2006.01)
 *H02K 5/22* (2006.01)
 *H02K 11/33* (2016.01)
 *H02K 15/00* (2006.01)

(58) Field of Classification Search
 USPC .......................................................... 310/71
 See application file for complete search history.

(56) References Cited

U.S. PATENT DOCUMENTS

2008/0137266 A1\* 6/2008 Jensen ...................... H02B 1/21
 710/316
2015/0380912 A1\* 12/2015 Krause ................... H02B 11/12
 29/854

FOREIGN PATENT DOCUMENTS

WO 20130166562 A1 11/2013
WO 20180114688 A1 6/2018

\* cited by examiner

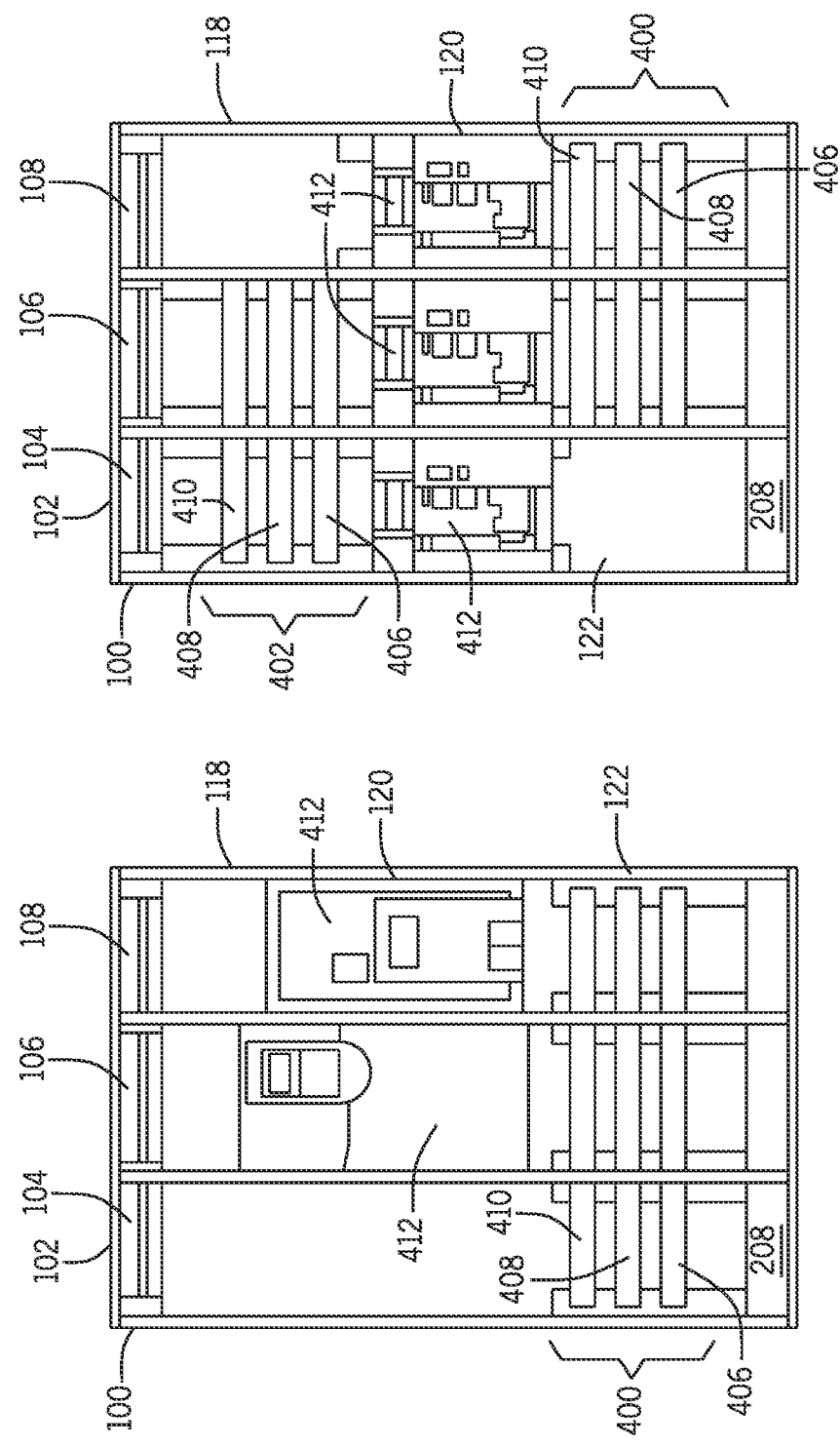

SYSTEMS AND METHODS FOR MOTOR CONTROL CENTER BUS BARS

BACKGROUND

The present disclosure relates generally to motor control centers (MCCs) for industrial automation systems. More specifically, the present disclosure relates to using bus bars to distribute power within an MCC of an industrial automation system.

Industrial automation systems may be used to provide automated control of one or more actuators. A controller may output a conditioned power signal to an actuator to control movement of the actuator. Multiple controllers of an industrial automation system may be grouped together, along with other components, and housed in an enclosure to form an MCC. MCCs are divided into vertical sections, with each section further divided into one or more buckets. The buckets are configured to receive units. Typically, power distribution systems for MCCs include a set of one or more horizontal bus bars extending across the center of the back plane of the MCC to deliver power to each section. One or more vertical bus bars are electrically coupled to the one or more horizontal bus bars and disposed in a parallel plane, offset from the one or more horizontal bus bars along the depth of the MCC.

While this configuration has certain advantages, the power distribution system occupies a significant depth of the MCC enclosure, thus preventing the use units having a depth greater than a threshold dimension from being used in the MCC. Further, for bus bars rated for higher currents (e.g., 4000 A, 6300 A, etc.), the single set of horizontal bus bars extending across the center of the back plane of the MCC can generate an amount of heat that may put stress on more sensitive units of the MCC. Accordingly, it may be desirable to provide customers an option for an MCC power distribution system that occupies less depth of the enclosure and/or does not get as hot as currently available models.

BRIEF DESCRIPTION

In one embodiment, a motor control center (MCC) for an industrial automation system, includes an enclosure housing comprising a plurality of sections, including a first section having one or more buckets, including a first bucket, a first bus bar, a second bus bar, and a third bus bar extending horizontally across the first section along a back plane of the enclosure housing, and a first electrical component, configured to perform one or more functions of the MCC, disposed within the first bucket of the first section. The first electrical component is directly electrically coupled to the first set of bus bars such that the first electrical component draws a first phase of power from the first bus bar, a second phase of power from the second bus bar, and a third phase of power from the third bus bar.

In another embodiment, a motor control center (MCC) enclosure for an industrial automation system includes a housing having a plurality of sections, including a first section, the first section including one or more buckets, including a first bucket configured to receive a first electrical component that performs one or more functions of the MCC, and a first set of bus bars extending horizontally across the first section along a back plane of the enclosure. The first set of bus bars includes a first bus bar configured to directly electrically couple to the first electrical component and to provide a first phase of power to the first electrical component, a second bus bar configured to directly electrically couple to the first electrical component and to provide a second phase of power to the first electrical component, and a third bus bar configured to directly electrically couple to the first electrical component and to provide a third phase of power to the first electrical component.

In yet another embodiment, a method includes providing an enclosure for a motor control center (MCC) of an industrial automation system, wherein the enclosure includes a plurality of sections, including a first section, wherein the first section includes one or more buckets, including a first bucket, installing a first bus bar that extends horizontally across the first section along a back plane of the enclosure, wherein the first bus bar is configured to directly electrically couple to a first electrical component, configured to perform one or more functions of the MCC, disposed in the first bucket and to provide a first phase of power to the first electrical component, installing a second bus bar that extends horizontally across the first section along the back plane of the enclosure, wherein the second bus bar is configured to directly electrically couple to the first electrical component disposed in the first bucket and to provide a second phase of power to the first electrical component, and installing a third bus bar that extends horizontally across the first section along the back plane of the enclosure, wherein the second bus bar is configured to directly electrically couple to the first electrical component disposed in the first bucket and to provide a third phase of power to the first electrical component.

DRAWINGS

These and other features, aspects, and advantages of the present embodiments will become better understood when the following detailed description is read with reference to the accompanying drawings in which like characters represent like parts throughout the drawings, wherein.

Figure 6C:
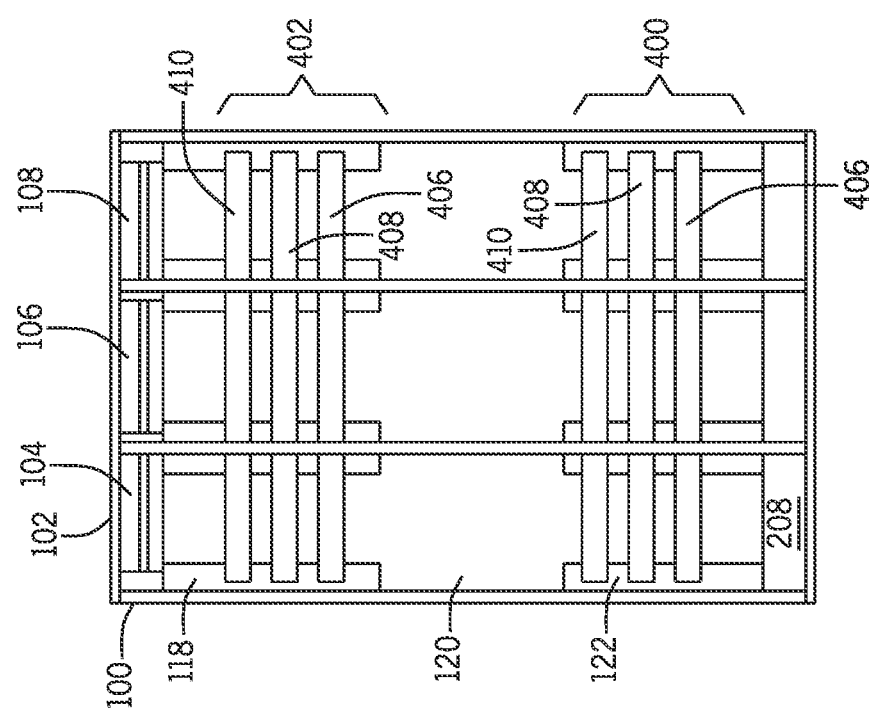
FIG. 6A illustrates an embodiment of an MCC having three sections, three buckets per section, and a single set of bus bars along back plane behind the bottom row of buckets, in accordance with embodiments presented herein.
FIG. 6B is illustrates an embodiment of an MCC having three sections, three buckets per section, a first set of bus bars along back plane across two sections of the bottom row of buckets and a second set of bus bars along back plane across two sections of the top row of buckets, offset from the first set, in accordance with embodiments presented herein.
Figure 7:
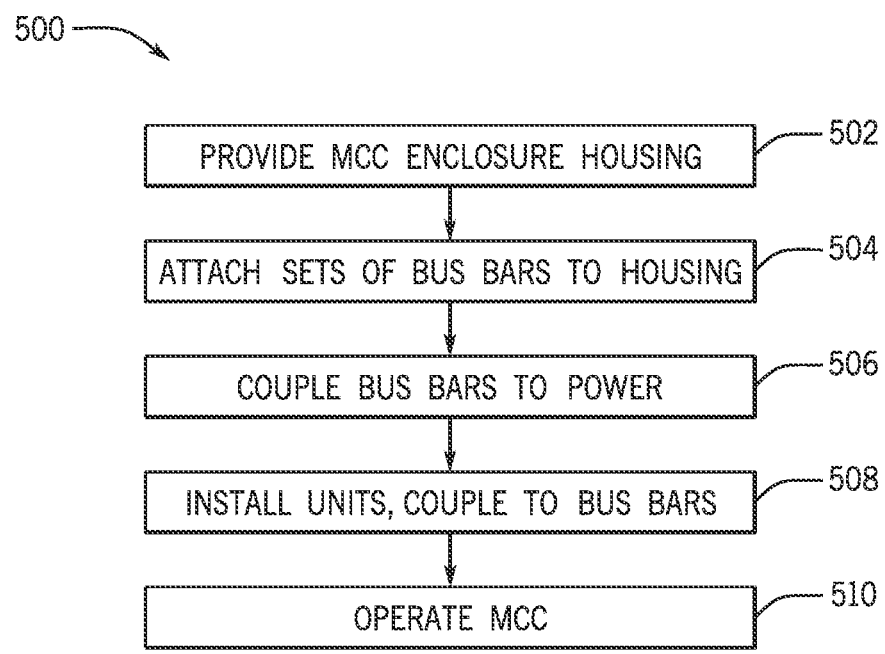

FIG. 6C illustrates an embodiment of an MCC having three sections, three buckets per section, and a first set of bus bars along back plane behind the bottom row of buckets, and a second set of bus bars along back plane behind the top row of buckets, in accordance with embodiments presented herein; and FIG. 7 is a flow chart of a process for manufacturing and/or assembling an MCC, in accordance with embodiments presented herein;

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

An industrial automation system may utilize a controller to output a conditioned power signal to one or more actuators to control movement of the actuators. The controller may be combined with other components in a housing or enclosure to form a motor control center (MCC) that controls the movement of multiple actuators. An enclosure of an MCC may be divided into one or more vertical sections, with each section further divided into one or more buckets that are configured to receive units (e.g., electrical components that perform functions of the MCC, such as variable frequency drives (VFDs), programmable logic controllers (PLCs), programmable automation controllers (PACs), contactors, starters, overload protection components, fuses, circuit breakers, disconnects, short circuit protectors, etc.). Systems for providing power to the various buckets typically include a set of one or more horizontal bus bars extending across a center of a back plane of the MCC to deliver power to each section and one or more vertical bus bars that are electrically coupled to the one or more horizontal bus bars and offset from the one or more horizontal bus bars in a parallel plane, offset from the back plane along the depth of the MCC to distribute power from the horizontal bus bars to the various buckets. While such a configuration has certain advantages, the two planes of bus bars occupy a significant depth of the MCC enclosure, thus preventing the use of units having a depth greater than a threshold dimension from being compatible with the MCC. Furthermore, for bus bars rated for higher currents (e.g., 4000 A, 6300 A, etc.), the single set of horizontal bus bars extending across the center of the back plane of the MCC can generate an amount of heat that may put stress on more temperature-sensitive units.

The disclosed techniques include a power distribution system for an MCC that includes multiple sets of horizontal bus bars, disposed on a single plane (e.g., the back plane of the MCC enclosure) that directly electrically couple to and provide power to units installed within the buckets of the MCC. In some embodiments, each bus bar in a set of bus bars may be configured to provide a phase of power to a unit installed within a bucket. Because the bus bars are disposed in a single plane, the MCC power distribution system occupies a shallower depth volume of the MCC enclosure than two-plane systems, thus allowing units with greater depths to be used in the same depth enclosures, and/or allowing the depth of the enclosure to be reduced. Further, because the horizontal bus bars are distributed across a height of the enclosure, rather than running solely along the centerline of the enclosure, the maximum current running through any given bus bar is lower, because a single set of bus bars are not carrying the current for the entire MCC, thus reducing the heat put in off by each bus bar. Accordingly, the heat distribution across the back plane of the enclosure is more even, and the peak temperature within the enclosure is lower. Furthermore, because each bus bar is carrying less current, the cross-section of each bus bar can be reduced, further reducing the depth occupied by the MCC power distribution system.

Figure 1:
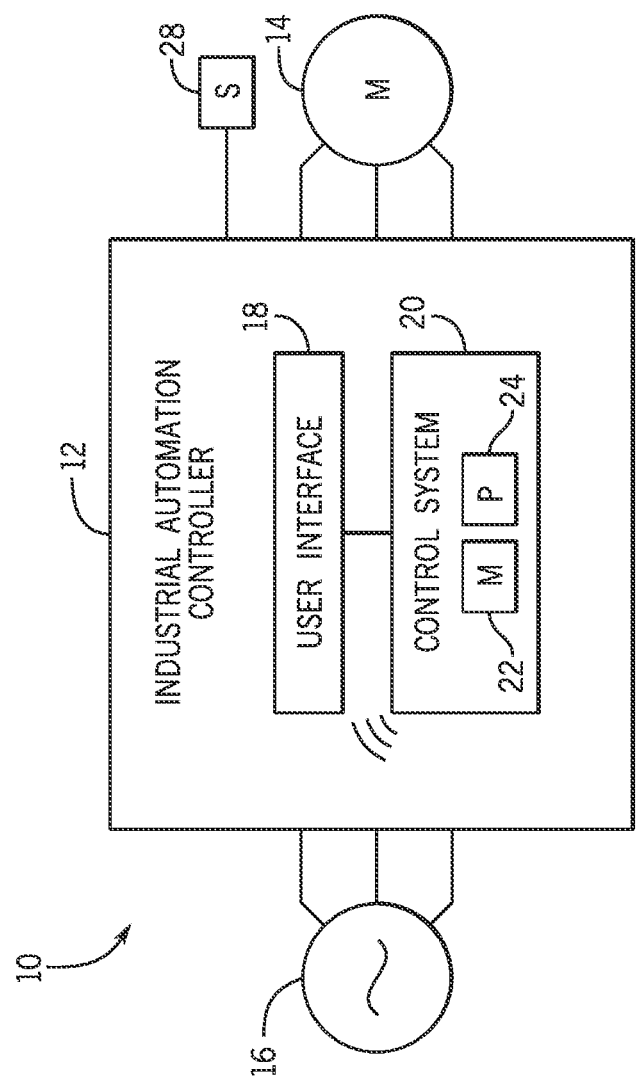
FIG. 1 illustrates a schematic view of an industrial automation system, in accordance with embodiments presented herein.

By way of introduction, FIG. 1 is a schematic view of an industrial automation system 10. As shown, the industrial automation system 10 includes a controller 12 and an actuator 14 (e.g., a motor). The industrial automation system 10 may also include, or be coupled to, a power source 16. The power source 16 may include a generator, a battery (or other power storage device), or an external power grid. Though the controller 12 shown in FIG. 1 is a stand-alone controller 12, in more complex industrial automation systems 10, one or more controllers 12 may be grouped together with other components in a motor control center (MCC, shown and described below with regard to FIG. 2) to control multiple actuators. In the instant embodiment, the controller 12 includes a user interface 18, such as a human machine interface (HMI), and a control system 20, which may include a memory 22 and a processor 24. The controller 12 may include a cabinet or some other enclosure for housing various components of the industrial automation system 10, such as a motor starter, a disconnect switch, etc.

The control system 20 may be programmed (e.g., via computer readable code or instructions stored on the memory 22 and configured to be executed by the processor 24) to provide signals for driving the motor 14. In certain embodiments, the control system 20 may be programmed according to a specific configuration desired for a particular application. For example, the control system 20 may be programmed to respond to external inputs, such as reference signals, alarms, command/status signals, etc. The external inputs may originate from one or more relays or other electronic devices. The programming of the control system 20 may be accomplished through software configuration or firmware code that may be loaded onto the internal memory 22 of the control system 20 or programmed via the user interface 18 of the controller 12. The control system 20 may respond to a defined set of operating parameters. The settings of the various operating parameters determine the operating characteristics of the controller 12. For example, various operating parameters may determine the speed or torque of the motor 14 or may determine how the controller 12 responds to the various external inputs. As such, the operating parameters may be used to map control variables within the controller 12 or to control other devices communicatively coupled to the controller 12. These variables may include, for example, speed presets, feedback types and values, computational gains and variables, algorithm adjustments, status and feedback variables, programmable logic controller (PLC) like control programming, and the like.

In some embodiments, the controller 12 may be communicatively coupled to one or more sensors 26 for detecting operating temperatures, voltages, currents, pressures, flow rates, etc. within the industrial automation system 10. With feedback data from the sensors, the control system 20 may keep detailed track of the various conditions under which the industrial automation system 10 may be operating. For example, the feedback data may include conditions such as actual motor speed, voltage, frequency, power quality, alarm conditions, etc.

Figure 2:
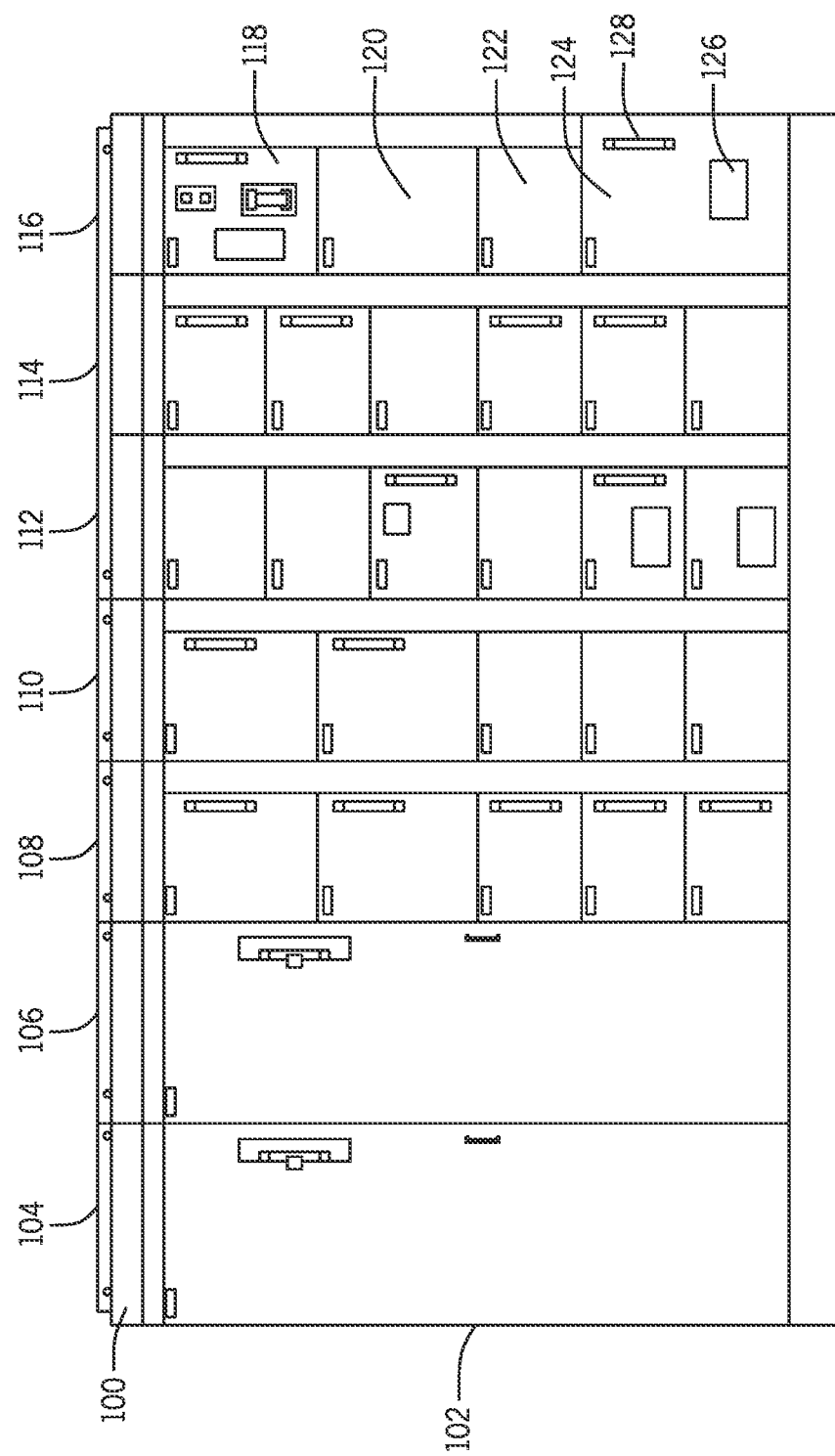
FIG. 2 is a front view of an embodiment of an MCC, in accordance with embodiments presented herein.

As mentioned above, in some complex industrial automation systems 10, one or more controllers and/or other industrial automation components (e.g., variable frequency drives (VFDs), PLCs, programmable automation controllers (PACs), contactors, starters, overload protection components, fuses, circuit breakers, disconnects, short circuit protectors, etc.) may be combined into an enclosure or cabinet and referred to as an MCC. FIG. 2 is a front view of an embodiment of an MCC 100. As shown, the MCC 100 includes an enclosure 102 that is divided into vertical sections 104, 106, 108, 110, 112, 114, 116. Each section may be further divided into one or more buckets 118, 120, 122, 124, which may be configured to receive units. The units may include, for example, motor controllers, VFDs, PLCs, PACs, contactors, starters, overload protection components, fuses, circuit breakers, disconnects, short circuit protectors, and so forth. In some embodiments, the size of each bucket 118, 120, 122, 124 may be customized to the type of unit the bucket 118, 120, 122, 124 is configured to receive. In other embodiments, different MCCs 100 may be available preconfigured with differently sized buckets. As shown, the cabinet doors 126 of some buckets may include disconnect switches 128 for disconnecting the respective unit from the MCC 100. Accordingly, to remove a unit, a user may actuate the disconnect switch 128 (e.g., from "on" to "off") to electrically disconnect the unit from the MCC 100. The user may then open the cabinet door 126, and physically remove the unit from the enclosure 102. If the unit is being replaced with a different unit, the new unit may be physically installed in the bucket 124, the cabinet door 126 closed, and the disconnect switch 128 actuated (e.g., from "off" to "on").

Figure 3:
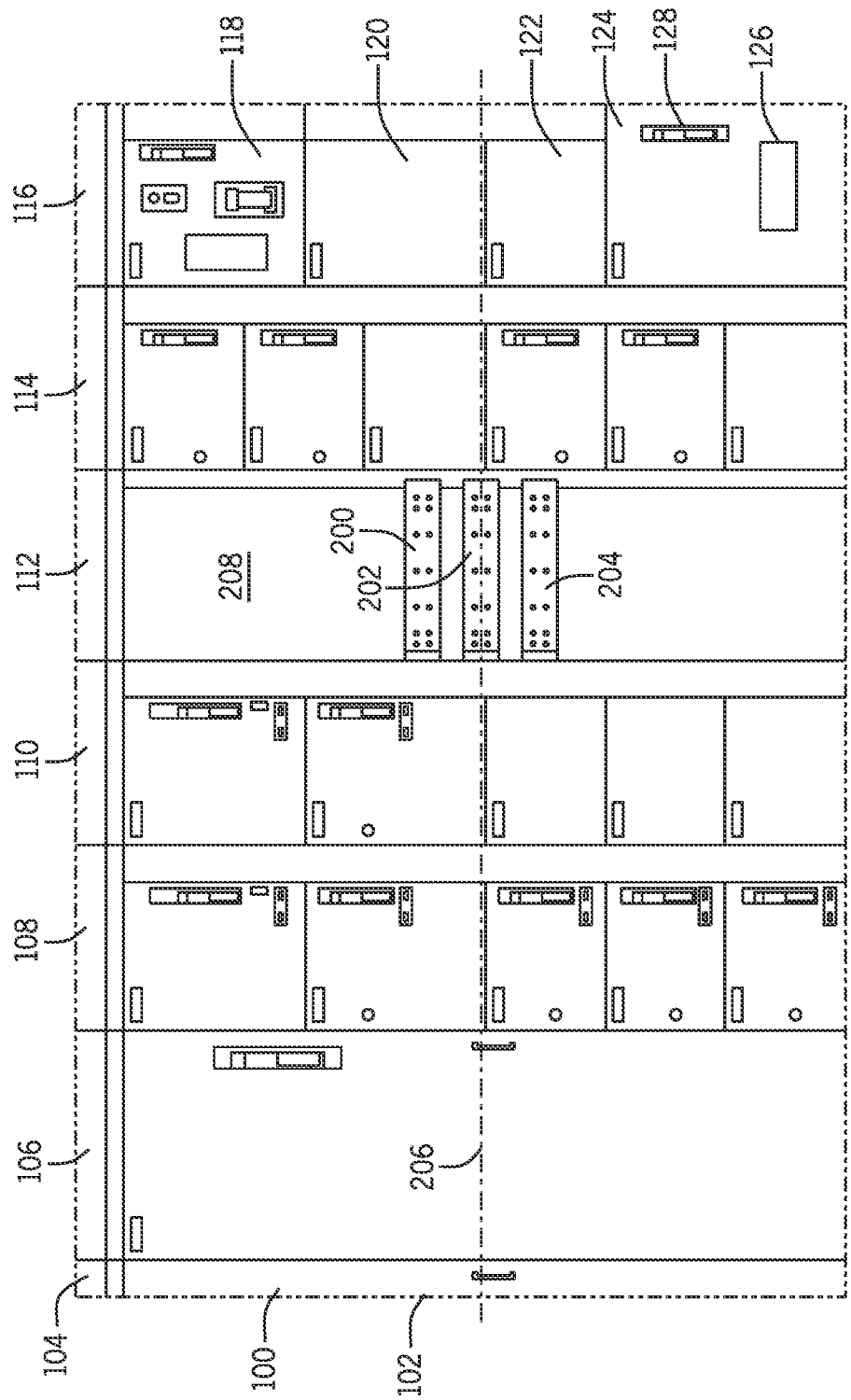
FIG. 3 is a front view of the MCC of FIG. 2 with a section of buckets omitted, in accordance with embodiments presented herein.

FIG. 3 is a front view of the MCC 100 of FIG. 2 with a section 112 of buckets omitted. Typically, power is provided to the various sections 104, 106, 108, 110, 112, 114, 116 of the MCC 100 via a set of three horizontal bus bars 200, 202, 204 that extend horizontally a full width of the MCC 100 along a center line 206 of a back plane 208 of the MCC 100. As shown, a first bus bar 200 conducts first power phase, a second bus bar 202 conducts a second power phase, and a third bus bar 204 conducts a third power phase.

Figure 4:
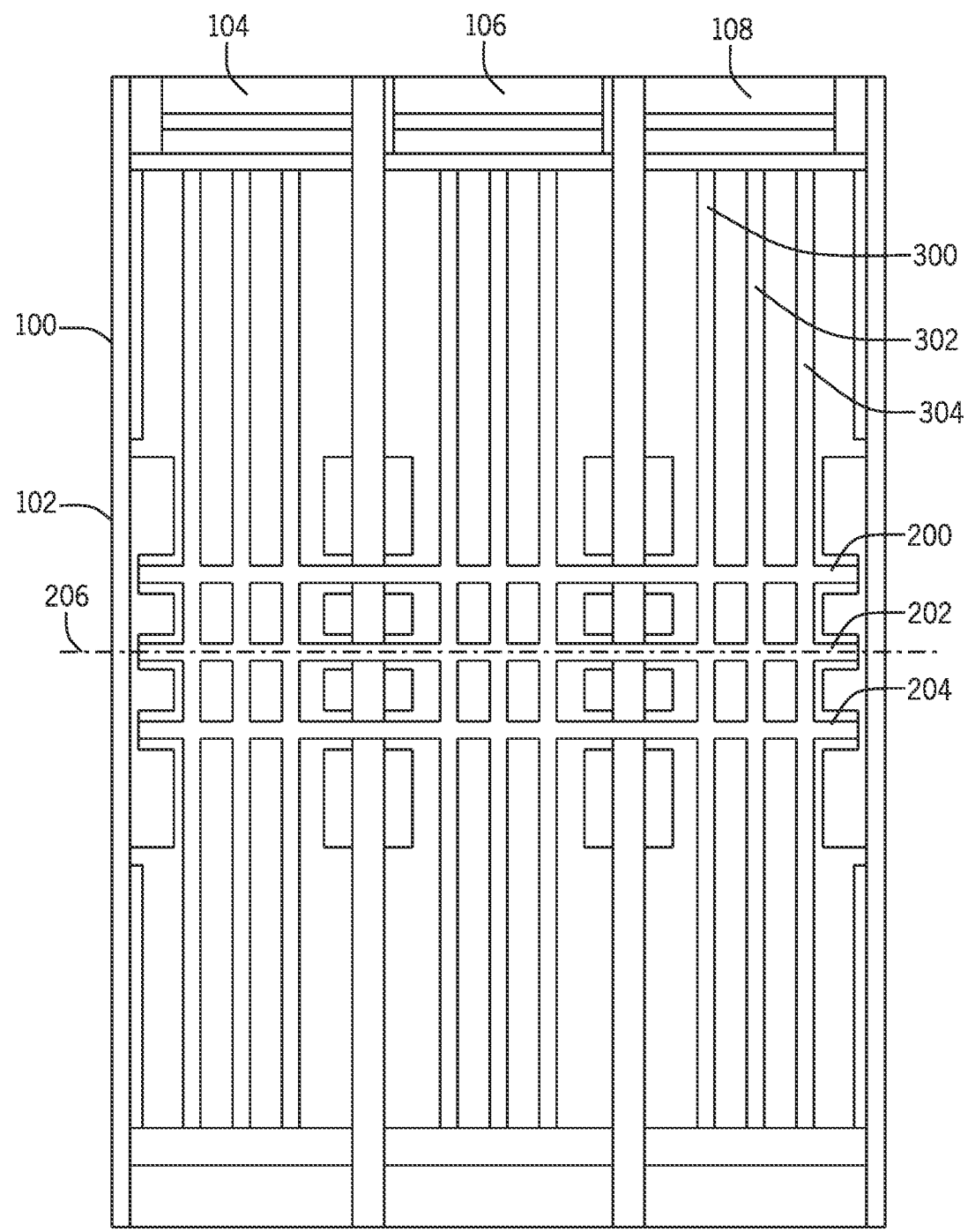
FIG. 4 is a rear view of a different MCC than is shown in FIGS. 2 and 3, in accordance with embodiments presented herein.

FIG. 4 is a rear view of a different MCC 100. It should be noted that the MCC 100 shown in FIG. 4 is a different embodiment from the MCC 100 shown in FIGS. 2 and 3 in that the MCC 100 shown in FIG. 4 has three sections 104, 106, 108 instead of the seven sections shown in FIGS. 2 and 3. As with the MCC 100 shown in FIG. 3, the MCC 100 of FIG. 4 includes three horizontal bus bars 200, 202, 204 that extend horizontally a full width of the MCC 100 along the center line 206 of the back plane 208 of the MCC 100. A set of three vertical bus bars 300, 302, 304 in each section 104, 106, 108 transmit the three phases of power from the horizontal bus bars 200, 202, 204 to the various buckets (not shown) in each section 104, 106, 108. Specifically, each of the vertical bus bars 300, 302, 304 is electrically coupled to a respective horizontal bus bar 200, 202, 204 (e.g., vertical bus bar 300 is coupled to horizontal bus bar 200, vertical bus bar 302 is coupled to horizontal bus bar 202, and vertical bus bar 304 is coupled to horizontal bus bar 204). The vertical bus bars 300, 302, 304 may be disposed in a plane parallel to the back plane 208 of the MCC 100, but offset from the horizontal bus bars 200, 202, 204 toward an interior of the enclosure. In some embodiments, conductive elements may be disposed between electrically coupled vertical bus bars 300, 302, 304 and horizontal bus bars 200, 202, 204, such that the conductive element accounts for the offset between the vertical bus bars 300, 302, 304 and the horizontal bus bars 200, 202, 204. Correspondingly, insulators (e.g., components made of a rubber, polymer, or some other non-conductive material) may be disposed between vertical bus bars 300, 302, 304 and horizontal bus bars 200, 202, 204 that are not electrically coupled to one another to isolate vertical bus bars 300, 302, 304 and horizontal bus bars 200, 202, 204 from one another. The insulators may be configured to prevent unintended electrical coupling between vertical bus bars 300, 302, 304 and horizontal bus bars 200, 202, 204, interference between vertical bus bars 300, 302, 304 and horizontal bus bars 200, 202, 204, and/or heat transfer (e.g., conductive, convective, radiative, etc.) between vertical bus bars 300, 302, 304 and horizontal bus bars 200, 202, 204. The insulators may be made of rubber, polymer, or some other material that does not conduct electricity and/or heat.

Though the MCC power distribution system with horizontal and vertical bus bars shown in FIG. 4 has certain advantages over other configurations (e.g., ease of access to power for different sized buckets, ease of manufacture/assembly, and so forth), having two sets of bus bars running in offset planes occupies a certain depth of the enclosure that cannot be utilized by units of the MCC 100. Accordingly, an MCC 100 with such a power distribution system may not be compatible with units having a depth that exceeds a threshold amount. Further, for MCCs 100 rated for higher amperages (e.g., 4,000 A bus or a 6300 A bus), and/or MCCs 100 with heat-sensitive units, the current running through the power distribution system with horizontal and vertical bus bars shown in FIG. 4 may result in higher than desired temperatures within the enclosure 102 because the current for the whole MCC runs through the single set of horizontal bus bars. Accordingly, an MCC power distribution system with a different configuration of bus bars may be better suited for certain applications.

Figure 5:
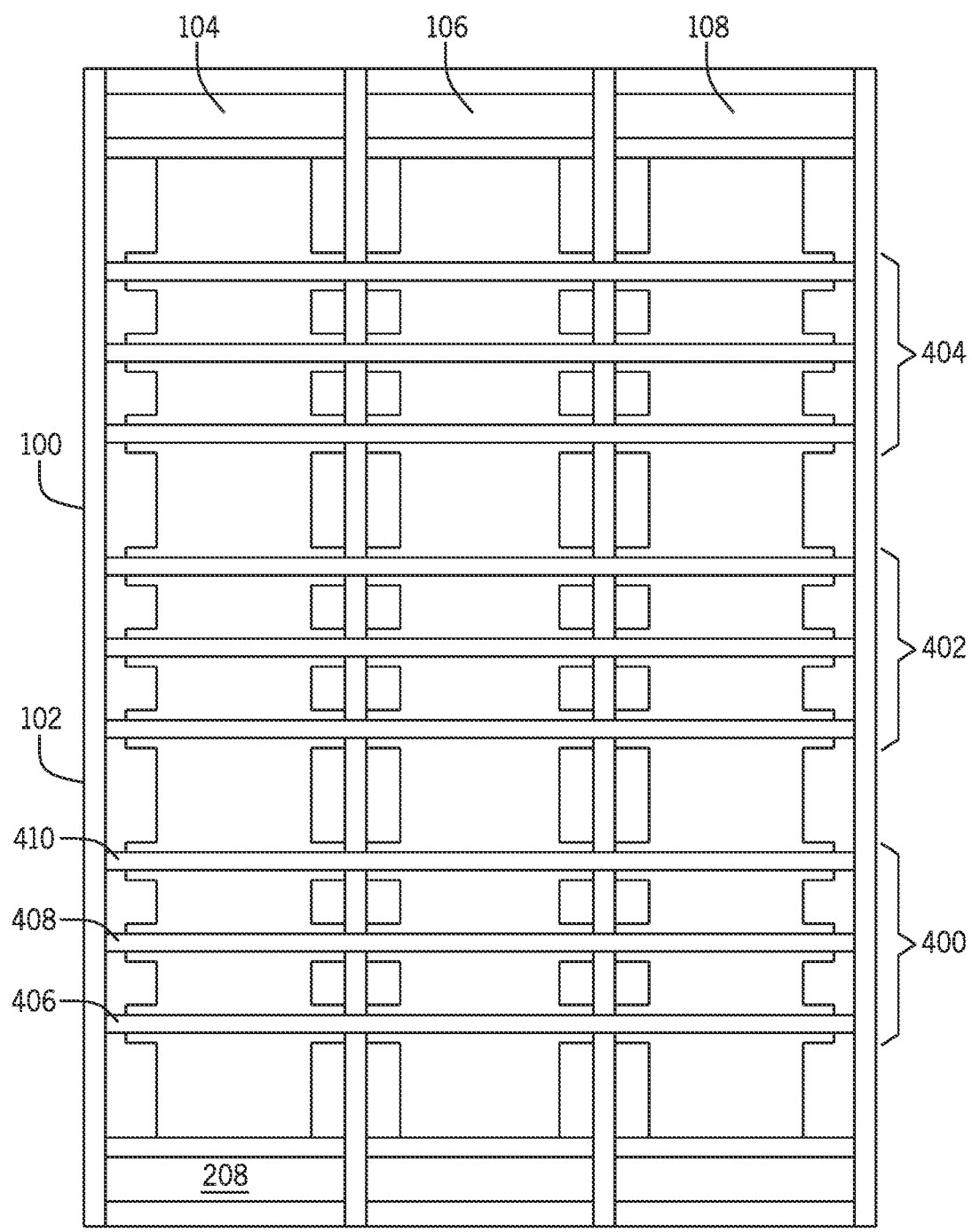
FIG. 5 is a rear view of an MCC having three sets of bus bars that extend horizontally on the back plane of the MCC across the sections of the MCC 100, in accordance with embodiments presented herein.

FIG. 5 is a rear view of an MCC 100 having three sets of bus bars 400, 402, 404 that extend horizontally on the back plane 208 of the MCC 100 across the sections 104, 106, 108 of the MCC 100. Each set of bus bars 400, 402, 404 includes three bus bars 406, 408, 410, one for each of three phases of power. Rather than having vertical bus bars to distribute power to the various buckets, units in the various buckets electrically couple directly to the bus bars 406, 408, 410 for power. As such, the MCC 100 shown in FIG. 5 does not have any vertical bus bars. Directly coupled may include coupling via a fastener (e.g., a bolt or other threaded fastener), a snap, a clamp, a terminal, or an element of the unit that makes physical contact with the bus bars 406, 408, 410. Accordingly, because all of the bus bars 406, 408, 410 of the MCC are in a single plane, the MCC power distribution system shown in FIG. 5 occupies a shallower depth volume of the enclosure 102 than the MCC power distribution system shown in FIG. 4, thus allowing units with greater depths to be used in the same depth enclosures, or allowing the depth of the enclosure to be reduced (e.g., from 800 mm to 600 mm). However, it should be understood that embodiments in which all bus bars 406, 408, 410 within a set of bus bars are not in a single plan are also envisaged. For example, in one embodiment, each of the three bus bars 406, 408, 410 may be disposed on a different plane such that the three bus bars 406, 408, 410 are offset form one another relative to the back plane 208 of the MCC 100. In another embodiment, two of the bus bars 406, 410 may be on a first plane, while one of the bus bars 408 is on a second plane, offset from the first plane, relative to the back plane 208 of the MCC 100. It should be understood, however, that these examples are not intended to be limiting that that other embodiments in which the bus bars 406, 408, 410 within a set of bus bars are distributed across multiple planes and not in a single plane, relative to the back plane 208 of the MCC 100, are also envisaged. Further, because the bus bars 406, 408, 410 are distributed across a height of the enclosure 102, rather than running solely along the centerline of the enclosure, the maximum current running through any single horizontal bus bar is much lower than the horizontal bus bars 200, 202, 204 shown in FIG. 4, and thus the heat put off by the bus bars 406, 408, 410 is distributed across the height of the enclosure 102, resulting in a more even distribution of heat across the back plane 208 of the enclosure 102, and a lower peak temperature within the enclosure. Moreover, because each bus bar 406, 408, 410 is carrying less current, the cross-section of each bus bar 406, 408, 410 can be reduced, further reducing the depth occupied by the MCC power distribution system.

Though the embodiment of the MCC 100 shown in FIG. 5 includes three sets 400, 402, 404 of bus bars 406, 408, 410, each extending across the entire width of the back plane 208 of the enclosure 102, it should be understood that other configurations are also envisaged. For example, in some embodiments, the bus bars 406, 408, 410 may only extend across one or more, but not all of the sections 104, 106, 108 of the MCC 100. Similarly, a given section 104, 106, 108 of the MCC 100 may have fewer than three sets 400, 402, 404 of bus bars 406, 408, 410 or more than three sets 400, 402, 404 of bus bars 406, 408, 410. For example, a section 104, 106, 108 of the MCC 100 may include 0, 1, 2, 3, 4, 5, 6, 7, 8, 9, 10, or more sets 400, 402, 404 of bus bars 406, 408, 410. In some embodiments, the number of sets 400, 402, 404 of bus bars 406, 408, 410 in a given section 104, 106, 108 of the MCC 100 may correspond to the number of buckets within that section. That is, a section 104, 106, 108 of the MCC 100 having four buckets may be equipped with four sets of bus bars 406, 408, 410, such that each unit disposed in each bucket of the section has a set of bus bars 406, 408, 410 to which to couple for power. However, embodiments are also envisaged in which the number of buckets in a section 104, 106, 108 of the MCC 100 does not correspond to the number of sets 400, 402, 404 of bus bars 406, 408, 410 for that section. For example, a section having four buckets may be equipped with 1, 2, 3, 5, 6, 7, 8, 9, 10, or more sets 400, 402, 404 of bus bars 406, 408, 410. Furthermore, in some embodiments, bus bars 406, 408, 410 may be removable to make room for deep equipment.

Furthermore, embodiments are also envisaged in which a set of bus bars includes fewer than three bus bars 406, 408, 410, or greater than three bus bars 406, 408, 410. For example, for systems not using three-phase power, the number of bus bars in each set may correspond to the number of power phases being used. However, in other embodiments, the number of bus bars in each set of bus bars may not correspond to the number of phases of power being used.

FIGS. 6A-6C illustrate various envisaged configurations of MCC 100. For example, FIG. 6A illustrates an embodiment of an MCC 100 having three sections 104, 106, 108, three buckets 118, 120, 122 per section, and a single set 400 of bus bars 406, 408, 410 along back plane 208 behind the bottom row of buckets. Accordingly, the top two rows of buckets may be left open, used for deep equipment (e.g., units 412 that are deeper than the enclosure 102 typically allows when installed in a bucket in front of bus bars 406, 408, 410), used with normal depth equipment, or some other use. In embodiments in which units 412 are installed in buckets 118, 120, 122 without bus bars, the units 412 may electrically couple to bus bars 406, 408, 410 running behind adjacent buckets.

FIG. 6B illustrates an embodiment of an MCC 100 having three sections 104, 106, 108, three buckets 118, 120, 122 per section, a first set 400 of bus bars 406, 408, 410 along back plane 208 across two sections of the bottom row of buckets and a second set 402 of bus bars 406, 408, 410 along back plane 208 across two sections of the top row of buckets, offset from the first set 400. Accordingly, the center row of buckets, and one bucket each on the top row of buckets and the bottom row of buckets may be left open, used for deep equipment, used with normal depth equipment, or some other use. In embodiments in which units 412 are installed in buckets 118, 120, 122 without bus bars, the units 412 may electrically couple to bus bars 406, 408, 410 running behind adjacent buckets.

FIG. 6C illustrates an embodiment of an MCC 100 having three sections 104, 106, 108, three buckets 118, 120, 122 per section, a first set 400 of bus bars 406, 408, 410 along back plane 208 behind the bottom row of buckets, and a second set 402 of bus bars 406, 408, 410 along back plane 208 behind the top row of buckets. Accordingly, the center row of buckets may be left open, used for deep equipment, used with normal depth equipment, or some other use. In embodiments in which units are installed in buckets 118, 120, 122 without bus bars, the units may electrically couple to bus bars 406, 408, 410 running behind adjacent buckets.

FIG. 7 is a flow chart of a process 500 for manufacturing and/or assembling an MCC. At block 502, an MCC enclosure housing is provided. As previously discussed, the MCC enclosure housing may include a plurality of sections, each including one or more buckets. Each bucket may be configured to receive a unit (e.g., motor controllers, VFDs, PLCs, PACs, contactors, starters, overload protection components, fuses, circuit breakers, disconnects, short circuit protectors, and so forth). The enclosure housing may have a depth of 600 mm, 800 mm, or some other depth.

At block 504, the bus bars are attached to the MCC enclosure housing. As previously discussed, the bus bars may be installed on the back plane of the MCC enclosure housing, or a plan parallel to the back plane, spanning across sections, and disposed behind one or more of the buckets. As previously described, some buckets may be configured to received deep equipment and, as such, may not have bus bars disposed behind the buckets in order to allow more volume (e.g., depth) within the enclosure for the deep equipment. The bus bars may be attached to the MCC enclosure housing using fasteners, adhesives, rivets, a fastener-free interface (e.g., snap into place), or some other mechanism.

At bock 506, the bus bars may be coupled to power. For example, a first bus bar may be coupled to a first phase of power, a second bus bar may be coupled to a second phase of power, and a third bus bar may be coupled to a third phase of power. As previously described, the bus bars may be coupled to power via cables, via conductors within the enclosure housing, or some other mechanism.

At block 508, one or more units are installed in the buckets and coupled directly to the respective bus bars behind the bucket. As previously described, the unit may be installed in the bucket, the cabinet door of the bucket closed, and the disconnect switch actuated from "off" to "on" into order to electrically couple the unit to the bus bars. The first bus bar may provide the first phase of power to the unit, the second bus bar may provide the second phase of power to the unit, and the third bus bar may provide the third phase of power to the unit. It should be understood, however, that the MCC enclosure may house multiple units, each being electrically coupled to a respective set of bus bars. In some embodiments, for units installed in buckets that do not have bus bars behind the bucket, the units may couple to bus bars behind adjacent buckets. At block 510, the MCC is operated to control the operation of one or more motors of an industrial automation system.

The disclosed techniques include a power distribution system for an MCC that includes multiple sets of horizontal bus bars, disposed on a single plane (e.g., the back plan of the MCC enclosure) that directly electrically couple to and provide power to units installed within the buckets of the MCC. In some embodiments, each bus bar in a set of bus bars may be configured to provide a phase of power to a unit installed within a bucket. Because the bus bars are disposed in a single plane, the MCC power distribution system occupies a shallower depth volume of the MCC enclosure than two-plane systems, thus allowing units with greater depths to be used in the same depth enclosures, and/or allowing the depth of the enclosure to be reduced. Further, because the horizontal bus bars are distributed across a height of the enclosure, rather than running solely along the centerline of the enclosure, the maximum current running through any given bus bar is lower, because a single set of bus bars are not carrying the current for the entire MCC, thus reducing the heat put off by each bus bar. Accordingly, the heat distribution across the back plane of the enclosure is more even, and the peak temperature within the enclosure is lower. Furthermore, because each bus bar is carrying less current, the cross-section of each bus bar can be reduced, further reducing the depth occupied by the MCC power distribution system.

While only certain features of the present disclosure have been illustrated and described herein, many modifications and changes will occur to those skilled in the art. It is, therefore, to be understood that the appended claims are intended to cover all such modifications and changes as fall within the true spirit of the embodiments described herein.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112 (f). However, for any claims containing elements designated in any other manner, it is intended that such elements are not to be interpreted under 35 U.S.C. 112 (f).

The invention claimed is:

1. A motor control center (MCC) for an industrial automation system, comprising:
an enclosure housing comprising a plurality of sections, including a first section, wherein the first section comprises one or more buckets, including a first bucket, wherein the enclosure housing has a first depth of at least 600 mm;
a first set of bus bars extending horizontally across the first section along a back plane of the enclosure housing, wherein the first set of bus bars comprises a first bus bar, a second bus bar, and a third bus bar; and
a first electrical component, configured to perform one or more functions of the MCC, disposed within the first bucket of the first section, wherein the first electrical component is directly electrically coupled to the first set of bus bars such that the first electrical component draws a first phase of power from the first bus bar, a second phase of power from the second bus bar, and a third phase of power from the third bus bar.

2. The MCC of claim 1, comprising:
a second set of bus bars extending horizontally across the first section along the back plane of the enclosure housing, wherein the second set of bus bars comprises a fourth bus bar, a fifth bus bar, and a sixth bus bar; and
a second electrical component disposed within a second bucket of the first section, wherein the second electrical component is directly electrically coupled to the second set of bus bars such that the second electrical component draws the first phase of power from the fourth bus bar, the second phase of power from the fifth bus bar, and the third phase of power from the sixth bus bar.

3. The MCC of claim 2, wherein the first depth is at least 800 mm, and wherein the first electrical component has a second depth and the second electrical component has a third depth, wherein the third depth exceeds the second depth.

4. The MCC of claim 1, wherein the MCC does not have any vertical bus bars.

5. The MCC of claim 1, wherein the first, second, and third bus bars are each rated for 4000 A.

6. The MCC of claim 1, wherein the first, second, and third bus bars are each rated for 6300 A.

7. The MCC of claim 1, wherein the first electrical component comprises a variable frequency drive (VFD), a programmable logic controller (PLC), a programmable automation controller (PAC), a contactor, a starter, an overload protection component, a fuse, a circuit breaker, a disconnect, a short circuit protector, or a combination thereof.

8. A motor control center (MCC) enclosure for an industrial automation system, comprising:
a housing comprising a plurality of sections, including a first section, wherein the first section comprises one or more buckets, including a first bucket configured to receive a first electrical component, configured to perform one or more functions of the MCC; and
a first set of bus bars extending horizontally across the first section along a back plane of the enclosure, wherein the enclosure does not include any vertical bars, and wherein the first set of bus bars comprises:
a first bus bar configured to directly electrically couple to the first electrical component and to provide a first phase of power to the first electrical component;
a second bus bar configured to directly electrically couple to the first electrical component and to provide a second phase of power to the first electrical component; and
a third bus bar configured to directly electrically couple to the first electrical component and to provide a third phase of power to the first electrical component.

9. The MCC enclosure of claim 8, comprising:
a second set of bus bars extending horizontally across the first section along the back plane of the enclosure, wherein the second set of bus bars comprises a fourth bus bar, a fifth bus bar, and a sixth bus bar; and
wherein a second bucket is configured to receive a second electrical component, wherein the second set of bus bars are configured to directly couple to the second electrical component such that the fourth bus bar provides the first phase of power, the fifth bus bar provides the second phase of power, and the sixth bus bar provides the third phase of power.

10. The MCC enclosure of claim 8, wherein the first, second, and third bus bars are each rated for 4000 A to 6300 A.

11. The MCC enclosure of claim 8, wherein the first, second, and third bus bars are directly electrically coupled to the first electrical component via a fastener, a snap, a clamp, a terminal, direct physical contact between the first, second, and third bus bars and the first electrical component, or a combination thereof.

12. The MCC enclosure of claim 8, wherein the enclosure has a depth of at least 800 mm.

13. A motor control center (MCC) enclosure for an industrial automation system, comprising:
a housing comprising a plurality of sections, including a first section, wherein the first section comprises one or more buckets, including a first bucket;
a first electrical component, configured to perform one or more functions of the MCC, disposed within the first bucket of the first section; and
a first set of bus bars extending horizontally across the first section along a back plane of the enclosure, wherein the first set of bus bars comprises:
a first bus bar configured to directly electrically couple to the first electrical component and to provide a first phase of power to the first electrical component;
a second bus bar configured to directly electrically couple to the first electrical component and to provide a second phase of power to the first electrical component; and
a third bus bar configured to directly electrically couple to the first electrical component and to provide a third phase of power to the first electrical component, wherein the first, second, and third bus bars are each rated for 4000 A to 6300 A.

14. The MCC enclosure of claim 13, wherein the first electrical component comprises a variable frequency drive (VFD), a programmable logic controller (PLC), a programmable automation controller (PAC), a contactor, a starter, an overload protection component, a fuse, a circuit breaker, a disconnect, a short circuit protector, or a combination thereof.

15. The MCC enclosure of claim 13, wherein the enclosure does not include any vertical bars.

16. The MCC enclosure of claim 13 comprising a second set of bus bars extending horizontally across the first section along the back plane of the enclosure housing, wherein the second set of bus bars comprises a fourth bus bar, a fifth bus bar, and a sixth bus bar.

17. The MCC enclosure of claim 16, comprising a second electrical component disposed within a second bucket of the first section, wherein the second electrical component is directly electrically coupled to the second set of bus bars such that the second electrical component draws the first phase of power from the fourth bus bar, the second phase of power from the fifth bus bar, and the third phase of power from the sixth bus bar.

18. The MCC enclosure of claim 17, wherein the first electrical component has a first depth and the second electrical component has a second depth, wherein the second depth exceeds the first depth.

19. The MCC enclosure of claim 13, wherein the housing has a third depth of at least 600 mm.

20. The MCC enclosure of claim 13, wherein the first, second, and third bus bars are directly electrically coupled to the first electrical component via a fastener, a snap, a clamp, a terminal, direct physical contact between the first, second, and third bus bars and the first electrical component, or a combination thereof.

* * * * *